United States Patent [19]

Shimizu et al.

[11] Patent Number: 4,542,195

[45] Date of Patent: Sep. 17, 1985

[54] METHOD FOR PREVENTING POLYMER SCALE DEPOSITION IN THE POLYMERIZATION OF AN ETHYLENICALLY UNSATURATED MONOMER

[75] Inventors: Toshihide Shimizu, Chiba; Ichiro Kaneko; Yoshiteru Shimakura, both of Ibaraki, all of Japan

[73] Assignee: Shin-Etsu Chemical Co., Ltd., Tokyo, Japan

[21] Appl. No.: 656,169

[22] Filed: Sep. 28, 1984

[30] Foreign Application Priority Data

Sep. 30, 1983 [JP] Japan .................. 58-182587

[51] Int. Cl.$^4$ ............... C08F 6/2; C08F 14/02
[52] U.S. Cl. ............................................. 526/62
[58] Field of Search .......................................... 526/62

[56] References Cited

FOREIGN PATENT DOCUMENTS

| | | | |
|---|---|---|---|
| 0062230 | 10/1982 | European Pat. Off. | |
| 53-13689 | 2/1978 | Japan | 526/62 |
| 57-155202 | 9/1982 | Japan | 526/62 |
| 57-185301 | 11/1982 | Japan | 526/62 |
| 57-190002 | 11/1982 | Japan | 526/62 |

*Primary Examiner*—Sam Silverberg
*Attorney, Agent, or Firm*—Toren, McGeady, Stanger, Goldberg & Kiel

[57] ABSTRACT

The invention provides an improved method for preventing polymer scale deposition on the reactor walls, for example, in the suspension polymerization of vinyl chloride by coating the walls prior to introduction of the polymerization mixture with a specific coating composition of which the essential ingredient is a combination of (a) a condensation product of an aromatic amine compound, e.g. aniline or a derivative thereof, and an aromatic nitro compound, e.g. nitrobenzene or a derivative thereof, and (b) a sulfonation product of a condensation product of an aromatic amine compound and an aromatic nitro compound in the form of a salt with an alkali metal or ammonium as dissolved in a solvent.

4 Claims, No Drawings

METHOD FOR PREVENTING POLYMER SCALE DEPOSITION IN THE POLYMERIZATION OF AN ETHYLENICALLY UNSATURATED MONOMER

BACKGROUND OF THE INVENTION

The present invention relates to a method for preventing polymer scale deposition on the reactor walls in the polymerization of an ethylenically unsaturated monomer such as vinyl chloride and styrene and a coating composition used therefor.

Ethylenically unsaturated monomers are polymerized in several types of polymerization procedures including suspension polymerization, emulsion polymerization, solution polymerization, gas-phase polymerization and bulk polymerization. One of the difficult problems common to all of these polymerization procedures in the prior art is the deposition of polymer scale on the reactor walls and the surfaces of other equipments such as the stirrer and the like coming into contact with the monomer under polymerization.

That is, when an ethylenically unsaturated monomer is polymerized in either one of the above mentioned polymerization procedures, the polymer is deposited more or less on the walls of the reactor and the surfaces of the stirrer and other equipments coming into contact with the monomer to form scale thereon so that various disadvantages are unavoidable such as the decrease in the yield of the desired polymer and lowered cooling capacity of the polymerization reactor as well as degraded quality of the polymer product due to the polymer scale eventually entering the polymer product as coming off the reactor walls. In addition, such polymer scale must be removed taking a great deal of time and labor in order to prepare the polymerization reactor for the next run of the polymerization. The scale removing works by man power present a very serious problem of safety against human body because the polymer scale usually contains a considerably large amount of the unreacted monomer absorbed therein which is sometimes toxic as is a matter of very serious concern in recent years in the case of vinyl chloride in particular.

A number of methods have been proposed hitherto to prevent the polymer scale deposition on the reactor walls. Exemplary of such methods, in particular, for the suspension polymerization of vinyl chloride are a method in which the reactor walls and the surfaces of the stirrer and the like are coated, prior to polymerization, with a polar organic compound such as amine compounds, quinone compounds, aldehyde compounds and the like or a dye or pigment (see, for example, Japanese Patent Publication Nos. 45-30343 and 45-30835), a method in which the walls and surfaces are coated with a polar organic compound or a dye having been treated with a metal salt (see Japanese Patent Publication No. 52-24953), a method in which the coating material is a mixture of an electron donor compound and an electron acceptor compound (see Japanese Patent Publication No. 53-28347) and a method in which the coating material is an inorganic salt or an inorganic complex compound (see Japanese Patent Publication No. 52-24070).

These prior art methods by providing a coating layer on the reactor walls are indeed effective at least to some extent but the effectiveness of a single coating treatment is not so lasting that the scale preventing power of a coating is rapidly lost when polymerization runs are repeated 5 to 6 times or more after a coating treatment. Therefore, it has been eagerly desired to develop an industrially feasible method for the prevention of polymer scale deposition on the reactor walls in which the effect of a single coating treatment is lasting over repeated polymerization runs.

Further, the above mentioned coating methods are effective only in the polymerization runs in which the polymerization initiator is an azo compound or an organic peroxide having a long-chain alkyl group insoluble or hardly soluble in water while the desired effect is not exhibited or greatly reduced when, in the suspension polymerization of vinyl chloride, the polymerization initiator is an organic peroxide which is soluble in the monomer and simultaneously has a relatively high solubility in water to exceed, for example, 0.2% by weight at 20° C. Such an initiator is exemplified by di-2-ethoxyethylperoxy dicarbonate, bis-3-methoxybutylperoxy dicarbonate, di(butoxyethylperoxy) dicarbonate and the like. This problem virtually prohibits the industrial use of the organic peroxides of such a type as the polymerization initiator notwithstanding the advantages obtained by the use thereof in the quality of the polyvinyl chloride resin products including the absence of the phenomenon of incipient coloring of the resin in the course of molding as well as good thermal stability of the resin. Therefore, it would be greatly advantageous to develop a method for effectively preventing polymer scale deposition on the reactor walls in the suspension polymerization of vinyl chloride even by use of an organic peroxide of the above described type as the polymerization initiator.

Further, in contrast to the suspension polymerization of vinyl chloride which is usually performed in a stainless steel-made polymerization reactor, the emulsion or latex (co)polymerization of styrene or a combination of styrene, butadiene and, in some cases, acrylonitrile is performed usually in a glass-lined polymerization reactor solely due to the problem that no efficient method is known for the polymer scale prevention on the walls of a stainless steel-made polymerization reactor in the polymerization of such a monomer or combination of monomers. Needless to say, glass-lined reactors are less desirable in the industrial polymerization because, even by setting aside the expensiveness in comparison with stainless steel-made ones, the heat transfer through glass-lined reactor walls is poor and the glass-lining layers are susceptible to mechanical damages in addition to the low availability of glass-lined reactors of a large capacity. Therefore, it would be advantageous to develop an efficient method for the polymer scale prevention in the polymerization of styrene and the above mentioned monomers in a stailess steel-made polymerization reactor

SUMMARY OF THE INVENTION

It is therefore an object of the present invention to provide an improved method for the prevention of polymer scale deposition on the reactor walls in the polymerization of an ethylenically unsaturated monomer by means of a coating on the reactor walls according to which a very lasting effect is obtained by a single coating treatment so that many times of polymerization runs can be repeatedly performed in a polymerization reactor of which the inner walls have once been coated.

Another object of the invention is to provide an improved method for preventing polymer scale deposition on the reactor walls in a suspension polymerization of vinyl chloride even when the polymerization is performed using a monomer-soluble organic peroxide having a relatively high solubility in water of at least 0.2% by weight at 20 ° C. as the polymerization initiator.

A further object of the invention is to provide an improved method for efficiently preventing polymer scale deposition on the walls of a stainless steel-made reactor in the emulsion or latex (co)polymerization of styrene or a monomer mixture of styrene, butadiene and, in some cases, acrylonitrile.

A still further object of the invention is to provide a coating composition used in the above mentioned methods for preventing polymer scale deposition on the reactor walls in the various types of polymerization described above.

Thus, the coating composition of the present invention developed as a result of the extensive investigations undertaken by the inventors comprises:

(a) a condensation product of an aromatic amine compound and an aromatic nitro compound; and (b) an alkali metal or ammonium salt of a sulfonation product of the condensation product of an aromatic amine compound and an aromatic nitro compound, preferably, dissolved in a solvent.

The method of the invention comprises accordingly the steps of:

(i) coating the inner walls of a polymerization reactor prior to the introduction of the polymerization mixture with a coating composition described above; and (ii) drying the thus coated inner walls of the polymerization reactor.

DETAILED DESCRIPTION OF THE PREFERRED EMBODIMENTS

As is described above, the coating composition used in the inventive method essentially comprises the components (a) and (b) in combination. Once the coating composition is dried on the reactor walls, the coating layer formed thereon is no longer soluble or hardly soluble in water strongly adhering to the surface to exhibit remarkable effect of preventing polymer scale deposition. This effect of the inventive method can be exhibited irrespective of the types of the polymerization and formulations of the polymerization mixture presumably due to the strong electrically anionic nature of the coated surface to inhibit the specific adsorption of the molecular species in the polymerization mixture differently from the conventional compounds used for coating such as the amine compounds, quinone compounds, aldehyde compounds and the like.

The essential components (a) in the inventive coating composition is a condensation product of an aromatic amine compound and an aromatic nitro compound while the component (b) is an alkali metal or ammonium salt of the sulfonation product of such a condensation product. The aromatic amine compound is aniline or a nucleus-substituted aniline having one or two substituent groups. One of the substituent groups on the benzene nucleus is selected from the class consisting of $-NH_2$, $-Cl$, $-N=N-C_6H_5$, $-OH$, $-CO-CH_3$, $-OCH_3$, $-NH-CO-CH_3$, $-NH-C_6H_5$, $-NH-C_6H_4-NH_2$, $-NH-C_6H_4-OCH_3$, $-N(CH_3)_2$, $-NH-C_6H_4-OH$ and alkyl groups having 1 to 3 carbon atoms while the other of the substituent groups, if any, can be $-NH_2$, $-OH$ or $-CH_3$.

Exemplary of the aromatic amine compounds suitable for use in the preparation of the condensation product with an aromatic nitro compound are aniline, 1,2-, 1,3- and 1,4-phenylene diamines, 2-, 3- and 4-aminophenols, 2-, 3- and 4-chloroaniline, 4-aminoazobenzene, 2,4-diaminoazobenzene, 4-aminoacetanilide, 2-, 3- and 4-methylanilines, 2- and 4-amino diphenylamines, 4,4'-diamino diphenylamine, N,N-dimethyl-1,4-phenylene diamine, 4-amino-3'-methoxy diphenylamine, 4-amino-4'-hydroxy diphenylamine, 4-chloro-1,2-phenylenediamine, 4-methoxy-1,2-phenylenediamine, 2-amino-4-chlorophenol, 2,3-diaminotoluene and the like.

The aromatic nitro compound to be condensed with the above named aromatic amine compounds is nitrobenzene or a nucleus-substituted nitrobenzene having a substituent group which is selected from the class consisting of $-OH$, $-OCH_3$, $-OC_2H_5$, $-Cl$, $-NH_2$, $-COOH$ and $-SO_3H$.

Exemplary of the aromtic nitro compounds suitable for use in the preparation of the condensation product with an aromatic amine compound are nitrobenzene, 2-, 3- and 4-nitrophenols, 2-, 3- and 4-nitroanisoles, 2-, 3- and 4-nitrophenetoles, 2-, 3- and 4-chloronitrobenzenes, 2-, 3- and 4-aminonitrobenzenes, 2-, 3- and 4-nitrobenzoic acids, 2-, 3- and 4-nitrobenzene sulfonic acids and the like.

The condensation reaction of the aromatic amine and nitro compounds is performed in the presence of an inorganic acid and a condensation catalyst. Suitable inorgaic acids include hydrochloric, hydrobromic, sulfuric, nitric and phosphoric acids and suitable condensation catalysts include permanganic acid and salts thereof, e.g. potassium permanganate, chromic acid and related compounds, e.g. chromium trioxide, potassium bichromate and sodium chlorochromate, salts of nitric acid, e.g. silver and lead nitrates, halogens, e.g. iodine, bromine, chlorine and fluorine, peroxide compounds, e.g. hydrogen peroxide, sodium peroxide, benzoyl peroxide, potassium and ammonium persulfates, peracetic acid, cumene hydroperoxide, perbenzoic acid and p-menthane hydroperoxide, oxyacids, e.g. chloric and iodic acids, and salts thereof, e.g. sodium chlorate and potassium iodate, metal salts, e.g. iron (II) and (III) chlorides, copper sulfate, copper (I) and (II) chlorides and lead acetate, molecular oxygen and ozone, metal oxides, e.g. copper oxide, mercury oxide, ceric oxide, manganese dioxide and osmic acid, and the like.

The condensation reaction of the aromatic amine and nitro compounds is performed by adding the above named inorganic acid and the condensation catalyst to the mixture of these reactants and heating the mixture at a temperature of 100° to 300 ° C. for 10 to 30 hours under agitation. The mixing ratio of the reactants is preferably such that the amount of the aromatic nitro compound is in the range from 0.15 to 0.50 mole per mole of the aromatic amine compound. Although dependent on various other factors, the performance of the coating composition may generally be unsatisfactory when the mixing ratio of the reactants is outside the above range. The amounts of the inorganic acid and the condensation catalyst in the reaction mixture are preferably in the range from 0.02 to 0.50 mole and from 0.03 to 0.50 mole, respectively, per mole of the aromatic amine compound. Preparation of the condensation product may optionally be performed by first subjecting the aromatic amine compound alone to the condensation reaction in the presence of the inorganic acid and the condensation catalyst followed by the addition of the aromatic nitro compound to the reaction mixture to effect the condensation reaction thereof with the condensation product of the aromatic amine compound alone.

The component (b) as the other essential ingredient of the inventive coating composition is prepared by sulfonating the above obtained condensation product of the aromatic amine and nitro compounds followed by the neutralization of the sulfonic acid group to convert it into a salt form. The conditions for the sulfonation reaction may be conventional and the reaction is carried out, for example, at a temperature in the range from 35° to 90° C. using concentrated or fuming sulfuric acid or chlorosulfonic acid as the sulfonating agent in an amount of 2 to 15 times by weight of the condensation product. The thus obtained sulfonation product is then dispersed in an aqueous medium and neutralized by adding an alkaline compound such as lithium hydroxide, sodium hydroxide, potassium hydroxide, sodium carbonate, potassium carbonate, ammonia water, ammonium carbonate and the like in a calculated amount so that the desired alkali metal or ammonium salt of the sulfonated condensation product is obtained in the form of an aqueous solution since the thus neutralized salt is usually water-soluble. This aqueous solution may be used as such by admixing with the component (a) but it is sometimes advantageous that the water in the aqueous solution is evaporated to dryness to leave the salt in a solid form followed, if desired, by pulverization when convenience in the storage or transportation is desired.

When the method of the invention is practiced, a coating solution should be prepared which contains the above described components (a) and (b) dissolved therein each in a concentration suitable for the coating works and in a proportion to exhibit the full effectiveness of the polymer scale prevention. The concentration of the component (a) in the coating solution is preferably at least 0.01% by weight since a coating solution of a lower concentration cannot give a coating layer of sufficient thickness by a single application to the reactor walls. No particular upper limit is given of the concentration of the component (a) in the coating solution but it is usually about 5% by weight or less in consideration of the economy and the working efficiency of coating. The proportion of the component (a) to the component (b) in the coating solution should be such that the solution contains from 5 to 95 parts by weight of the former and from 95 to 5 parts by weight of the latter.

The solvent used for the preparation of the coating solution is not particularly limitative provided that the solvent has a good power of dissolving the components (a) and (b). The solvent may be water or an organic solvent such as an alcoholic solvent, ester solvent, ketone solvent, aliphatic or aromatic hydrocarbon solvent, halogenated hydrocarbon solvent or a mixture thereof.

The coating solution thus prepared is applied to the surface of the reactor walls and other parts coming into contact with the monomer during polymerization prior to the introduction of the polymerization mixture into the reactor followed by drying and, desirably, thorough washing with water. Drying of the coated surface may be performed either by blowing hot air at the wet surface with the coating solution or by performing the coating onto the surface heated in advance so that the solvent in the coating solution is rapidly evaporated as the solution is applied thereto. The dried coating film comprising the components (a) and (b) is no longer soluble in water so that the dried coating layer is never washed away by washing with water.

The coaing amount with the coating solution on the reactor walls should be at least 0.001 g/m$^2$ as dried in order to fully exhibit the desired effect for polymer scale prevention.

When the polymerization reactor has been provided with the coating layer of the inventive composition as dried on the inner walls, the materials pertaining to the polymerization reaction are introduced into the reactor to form a polymerization mixture according to the conventional procedure including the aqueous medium for polymerization, monomer or monomers, polymerization initiator, suspending or emulsifying agent and other additives according to need.

The method of the present invention is applicable to the polymerization of any ethylenically unsaturated monomers exemplified by vinyl halides such as vinyl chloride, vinyl esters such as vinyl acetate and propionate, acrylic and methacrylic acids as well as esters or salts thereof, maleic and fumaric acids as well as esters thereof and maleic anhydride, dienic monomers such as butadiene, chloroprene and isoprene, styrene, acrylonitrile, vinylidene halides, vinyl ethers and the like. These monomers may be homopolymerized singly or copolymerized as a combination of two kinds or more according to need. The effectiveness of the inventive method is not limited by the types of the polymerization or the formulations of the polymerization mixture although the most remarkable results are obtained in the polymerization in an aqueous medium such as the suspension and emulsion polymerization.

For example, the effectiveness of the inventive method in the suspension or emulsion polymerization is never reduced by the presence of known additives conventionally added to the polymerization mixture including the suspending agents such as a partially saponified polyvinyl alcohol and a water-soluble cellulose derivative, e.g. methylcellulose, anionic surface active agents such as sodium laurylsulfate, sodium dodecylbenzene sulfonate and sodium dioctyl sulfosuccinate, non-ionic surface active agents such as sorbitan monolaurate and polyoxyethylene alkyl ethers, fillers such as calcium carbonate and titanium dioxide, stabilizers such as tribasic lead sulfate, calcium stearate, dibutyltin dilaurate and dioctyltin mercaptide, lubricants such as rice wax and stearic acid, plasticizers such as dioctyl phthalate and dibutyl phthalate, chain transfer agents such as trichloroethylene and mercaptans, pH controlling agents and others.

Furthermore, the effectiveness of the inventive method is never influenced by the kind of the polymerization initiator used in the polymerization. As is known, a great variety of polymerization initiators are used in the polymerization of the ethylenically unsaturated monomers depending on the case. Some of the examples of the polymerization initiators are: lauroyl peroxide, cumene hydroperoxide, p-menthane hydroperoxide, 3,5,5-trimethylhexanoyl peroxide, diisopropylperoxy dicarbonate, di-2-ethylhexylperoxy dicarbonate, di-2-ethoxyethylperoxy dicarbonate, bis(3-methoxybutylmethylperoxy) dicarbonate, di(butoxyethylperoxy) dicarbonate, tert-butylperoxy pivalate, α-cumylperoxy neodecanoate, acetyl cyclohexylsulfonyl peroxide, azobisisobutyronitrile, azobis-2,4-dimethyl valeronitrile, potassium persulfate and the like.

In the suspension (co)polymerization of vinyl chloride or vinyl chloride and other comonomers, in particular, it is known that the peroxide initiators having extremely low solubility in water among the above named monomer-soluble ones, e.g. di-2-ethylhexylperoxy dicarbonate, 3,5,5-trimethylhexanoyl peroxide, α-cumylperoxy neodecanoate and the like, are not prferable due to the inferior quality of the polyvinyl chloride resin product such as the incipient coloring in the course of molding and poor thermal stability of the molded articles thereof while, on the other hand, those monomer-soluble peroxide initiators having a relatively low oleophilicity or a relatively high solubility in water of, for example, 0.2% by weight or larger at 20° C., e.g. di-2-ethoxyethylperoxy dicarbonate, bis(3-methoxybutylperoxy) dicarbonate, di(butoxyethylperoxy) dicarbonate and the like, are preferred due to the absence of the above mentioned problem if it were not for the other difficult problem of the relatively large amount of polymer scale deposition on the reactor walls. According to the inventive method, even such a less oleophilic peroxide initiator can be used quite satisfactorily in the suspension polymerization of vinyl chloride without the problem of polymer scale deposition on the reactor walls.

That is, the method of the present invention is quite satisfactorily applicable not only to the suspension and emulsion (co)polymerization of a vinyl halide, e.g. vinyl chloride, singly or as a mixture with other comonomers such as vinyl acetate but also to the preparation of beads and latexes of styrene, methyl methacrylate, acrylonitrile and the like as well as mixtures thereof in a stainless steel-made polymerization reactor and to the emulsion polymerization for the preparation of synthetic rubber latexes such as SBR, NBR, IR, IIR and the like.

In the following, the coating compositions according to the invention and the inventive method for polymer scale prevention are described in more detail by way of examples. In carrying out the inventive method, several monomer-soluble peroxide initiators were used of which the values of the solubility in water at 20° C. are shown below together with the respective abbreviations used in the description of examples. The solubility of the peroxide in water was determined iodometrically of the aqueous solution obtained by the centrifugal separation of an aqueous dispersion of the peroxide compound in water at 20° C.

| Peroxide compound | Abbreviation | Solubility in water, % |
|---|---|---|
| Di-2-ethylhexylperoxy dicarbonate | OPP | 0.04 |
| Lauroyl peroxide | LPO | 0.003 |
| 3,5,5-Trimethylhexanoyl peroxide | L-355 | 0.05 |
| α-Cumylperoxy neodecanoate | L-188 | 0.01 |
| Di-2-ethoxyethylperoxy dicarbonate | EEP | 0.41 |
| Bis(3-methoxybutylperoxy) dicarbonate | MPC | 0.24 |
| Di(butoxyethylperoxy) dicarbonate | BEP | 0.21 |

PREPARATION 1

Into a reaction vessel were introduced 200.0 g (2.148 moles) of aniline, 200.0 g (1.849 moles) of 1,2-phenylenediamine, 120.0 g (0.863 mole) of 2-nitrophenol and 138.8 g (1.332 moles as HCl) of 35% hydrochloric acid keeping the temperature of the mixture at 10° C. or below, into which 200.0 g of a 40% by weight aqueous solution of ammonium persulfate (0.351 mole as ammonium persulfate) were added dropwise followed by increase of the temperature to 60° C. where the mixture was continuously agitated for 6 hours and then further increase of the temperature to 185° C. where the mixture was continuously agitated for 15 hours while the water distillate including the condensation water formed by the reaction was being removed. The aniline distilled out as accompanied by the water distillate was separated from the water and returned to the reaction vessel. Thereafter, the temperature of the reaction mixture was further increased to 210° C. and heating was continued for 5 hours to complete the reaction.

The thus obtained reaction mixture in a molten state was poured into a large volume of diluted hydrochloric acid and the mixture was heated at 60° C. for 3 hours followed by filtration while the mixture was still hot to collect the solid material as separated from the unreacted aniline and 1,2-phenylenediamine. Further, the solid material on the filter paper was washed six times with water to remove the hydrochloric acid followed by drying to give a condensation product weighing 235.2 g, which is called the condensation product No. 1.

PREPARATION 2

Condensation products called No. 2 to No. 20 were prepared in substantially the same manner as in Preparation 1 described above each by using the aromatic amine compound, aromatic nitro compound, condensation catalyst and inorganic acid indicated in Table 1 below each in an amount also indicated in the table.

TABLE 1

| Condensation product No. | Aromatic amine compound (moles) | Aromatic nitro compound (moles) | Condensation catalyst (moles) | Inorganic acid (moles) |
|---|---|---|---|---|
| 2 | 4-Methylaniline (1.000) | Nitrobenzene (0.262) | Ammonium persulfate (0.118) | Hydrochloric acid (0.358) |
| 3 | Aniline + 1,4-Phenylenediamine (0.349) (0.651) | Nitrobenzene (0.407) | Ammonium persulfate (0.088) | Hydrochloric acid (0.334) |
| 4 | 4-Methyl- + 4-Aminodiphenyl- aniline amine (0.630) (0.370) | Nitrobenzene (0.330) | Ammonium persulfate (0.089) | Hydrochloric acid (0.452) |
| 5 | Aniline + 4-Aminodiphenylamine (0.664) (0.336) | Nitrobenzene (0.402) | Ammonium persulfate (0.098) | Hydrochloric acid (0.297) |
| 6 | Aniline + 4-Chloro-1,2- (0.605) phenylenediamine (0.395) | 2-Nitrophenol (0.162) | Ammonium persulfate (0.074) | Hydrochloric acid (0.270) |
| 7 | Aniline + 2-Aminophenol (0.540) (0.460) | 4-Nitrophenol (0.217) | Ammonium persulfate (0.044) | Hydrochloric acid (0.496) |
| 8 | Aniline + 3-Aminophenol (0.500) (0.500) | 4-Nitrophenetole (0.241) | Hydrogen + Iron (II) chloride peroxide (0.004) (0.296) | Hydrochloric acid (0.496) |
| 9 | Aniline + 4-Aminophenol (0.809) (0.191) | 2-Nitrophenol (0.116) | Hydrogen + Iron (II) chloride peroxide (0.006) (0.443) | Sulfuric acid (0.498) |
| 10 | Aniline (1.000) | 2-Nitroaniline | p-Menthane hydroperoxide | Sulfuric acid (0.462) |

TABLE 1-continued

| Condensation product No. | Aromatic amine compound (moles) | Aromatic nitro compound (moles) | Condensation catalyst (moles) | Inorganic acid (moles) |
|---|---|---|---|---|
| 11 | Aniline (0.682) + 4-Amino-4'-hydroxy diphenylamine (0.318) | 3-Nitroanisole (0.290) | Sodium iodate (0.118) | Hydrochloric acid (0.296) |
| 12 | Aniline (0.607) + 2-Amino-4-chlorophenol (0.393) | 2-Chloronitrobenzene (0.215) | Sodium chlorate (0.239) | Hydrochloric acid (0.263) |
| 13 | Aniline (0.578) + 4-Chloroaniline (0.422) | 4-Nitrobenzoic acid (0.148) | Benzoyl peroxide (0.107) | Hydrochloric acid (0.310) |
| 14 | Aniline (0.278) + 4-Methylaniline (0.722) | 3-Nitrophenol (0.335) | Copper (II) chloride (0.126) | Hydrochloric acid (0.298) |
| 15 | 4-Aminodiphenyl (0.370) + 1,3-Phenylenediamine (0.630) | 4-Nitrobenzene sulfonic acid (0.243) | Manganese dioxide (0.330) | Hydrochloric acid (0.393) |
| 16 | 4-Aminodiphenyl (0.400) + 1,2-Phenylenediamine (0.600) | 4-Nitroaniline (0.296) | Iron (III) chloride (0.096) | Hydrochloric acid (0.393) |
| 17 | Aniline (0.538) + 1,2-Phenylenediamine (0.462) | 4-Chloronitrobenzene (0.203) | Ammonium persulfate (0.132) | Hydrochloric acid (0.286) |
| 18 | Aniline (1.000) | Nitrobenzene (0.227) | Iron (II) chloride (0.141) | Hydrochloric acid (0.310) |
| 19 | " | Nitrobenzene (0.060) | Iron (III) chloride (0.103) | Hydrochloric acid (0.310) |
| 20 | " | Nitrobenzene (0.755) | Iron (III) chloride (0.103) | Hydrochloric acid (0.310) |

PREPARATION 3

A mixture formed of 50 g of the condensation product No. 1 and 300 g of concentrated sulfuric acid at 30° C. or below was warmed to 40° C. and agitated at the temperature to effect the sulfonation reaction until the reaction mixture was easily and completely soluble in a diluted ammonia water. Then the reaction mixture was poured into 1000 ml of water and the precipitated sulfonation product collected by filtration was washed with water and dispersed in 1000 ml of water. The sulfonation product in the dispersion was dissolved by adding 11.3 g of a 40% by weight aqueous solution of sodium hydroxide at 90° C. and the solution was evaporated to dryness to give 52.0 g of a solid residue as the sodium salt of the sulfonated condensation product which could be pulverized. This powdered product is called the sulfonated condensation product No. 21.

Similarly to the above procedure under substantially the same reaction conditions of temperature and time, sulfonated condensation products No. 22 to No. 40 were prepared from the condensation products No. 2 to No. 20 shown in Table 1 by using the sulfonating agents and the alkaline compounds indicated in Table 2.

TABLE 2

| Sulfonated condensation product No. | Condensation product No. | Sulfonating agent | Condensation product/sulfonating agent, ratio by weight | Reaction temperature, °C. | Reaction time, hours | Alkaline compound |
|---|---|---|---|---|---|---|
| 22 | 2 | Sulfuric acid | 100/200 | 90 | 10 | LiOH |
| 23 | 3 | " | 100/400 | 60 | 13 | " |
| 24 | 4 | " | 100/300 | 70 | 15 | " |
| 25 | 5 | 30% fuming sulfuric acid | 100/600 | 65 | 10 | " |
| 26 | 6 | " | 100/1000 | 50 | 9 | KOH |
| 27 | 7 | " | 100/800 | 75 | 5 | " |
| 28 | 8 | " | 100/700 | 40 | 8 | " |
| 29 | 9 | Sulfuric acid | 100/300 | 80 | 40 | Na$_2$CO$_3$ |
| 30 | 10 | " | 100/250 | 80 | 20 | " |
| 31 | 11 | " | 100/1200 | 35 | 30 | " |
| 32 | 12 | " | 100/300 | 60 | 25 | NH$_4$OH |
| 33 | 13 | " | 100/450 | 90 | 30 | " |
| 34 | 14 | Chlorosulfonic acid | 100/750 | 70 | 10 | " |
| 35 | 15 | " | 100/400 | 60 | 15 | (NH$_4$)$_2$CO$_3$ |
| 36 | 16 | " | 100/600 | 55 | 20 | " |
| 37 | 17 | Sulfuric acid | 100/250 | 90 | 25 | NaOH |
| 38 | 18 | " | 100/600 | 40 | 20 | " |
| 39 | 19 | 30% fuming sulfuric acid | 100/800 | 35 | 10 | " |
| 40 | 20 | " | 100/500 | 40 | 20 | " |

EXAMPLE 1

In each of the polymerization runs No. 1 to No. 21, of which No. 1 to No. 14 were undertaken for comparative purpose, the others being for the invention, the inner walls of a stainless steel-made polymerization reactor of 1000 liter capacity and the surface of the stirrer coming into contact with the monomer during polymerization were coated with a coating composition indicated below and the coated surface was dried by heating at 50° C. for 10 minutes followed by washing with water.

Experiments No. 1 to No. 7: a 0.5% by weight methyl alcohol solution of the condensation product No. 18

Experiments No. 8 to No. 14: a 0.5% by weight methyl alcohol solution of the sulfonated condensation product No. 38

Experiments No. 15 to No. 21: a methyl alcohol solution containing 0.35% by weight of the condensation product No. 18 and 0.15% by weight of the sulfonated condensation product No. 38.

Into the polymerization reactor thus coated on the inner walls were introduced 500 kg of an aqueous solution containing 150 g of a partially saponified polyvinyl alcohol and 50 g of a hydroxypropyl methylcellulose dissolved therein, 250 kg of vinyl chloride monomer and the polymerization initiator indicated in Table 3 in an amount also indicated in the same table to form a polymerization mixture and the polymerization reaction was performed by heating the mixture at 50° C. for 10 hours under agitation.

After completion of the polymerization reaction, the polymerizate slurry was discharged out of the reactor and the amount of the polymer scale deposition on the reactor walls was determined to give the results shown in Table 3. Further, the thus obtained polyvinyl chloride resin products were examined for the content of fish-eyes and the thermal stability of the resin in the manner described below to give the results shown in Table 3.

Determination of number of fish-eyes: a mixture composed of 100 parts by weight of the resin under testing, 50 parts by weight of dioctyl phthalate, 1 part by weight of dibutyltin dilaurate, 1 part by weight of cetyl alcohol, 0.25 part by weight of titanium dioxide and 0.05 part by weight of carbon black was milled for 7 minutes on a two-roller mill heated at 150° C. followed by sheeting into a resin sheet of 0.2 mm thickness of which the number of fish-eyes per 100 cm² area was visually counted under transmission of light.

TABLE 3

| Experiment No. | Polymerization initiator Compound | Amount added, g | Properties of polymer Thermal stability, minutes | Fish-eyes, pieces | Amount of scale deposition, g/m² |
|---|---|---|---|---|---|
| 1 | OPP | 100 | 100 | 5 | 1 |
| 2 | LPO | 500 | 100 | 5 | 2 |
| 3 | L-355 | 300 | 100 | 5 | 1 |
| 4 | L-188 | 200 | 100 | 5 | 4 |
| 5 | EEP | 100 | 130 | 40 | 500 |
| 6 | MPC | 100 | 130 | 40 | 450 |
| 7 | BEP | 100 | 130 | 35 | 350 |
| 8 | OPP | 100 | 100 | 30 | 6 |
| 9 | LPO | 500 | 100 | 31 | 2 |
| 10 | L-355 | 300 | 100 | 30 | 0 |
| 11 | L-188 | 200 | 100 | 32 | 0 |
| 12 | EEP | 100 | 130 | 42 | 500 |
| 13 | MPC | 100 | 130 | 42 | 450 |
| 14 | BEP | 100 | 130 | 37 | 350 |
| 15 | OPP | 100 | 100 | 5 | 0 |
| 16 | LPO | 500 | 100 | 5 | 0 |
| 17 | L-355 | 300 | 100 | 5 | 0 |
| 18 | L-188 | 200 | 100 | 5 | 0 |
| 19 | EEP | 100 | 130 | 5 | 2 |
| 20 | MPC | 100 | 130 | 5 | 0 |
| 21 | BEP | 100 | 130 | 5 | 1 |

Determination of thermal stability: a mixture composed of 100 parts by weight of the resin under testing, 1 part by weight of dibutyltin maleate and 1 part by weight of stearic acid was milled for 10 minutes on a two-roller mill having a roller gap of 0.7 mm and heated at 170° C. followed by sheeting into a resin sheet of 0.7 mm thickness which was kept in a Geer's oven at 180° C. to determine the time in minutes taken before blackening of the resin sheet.

As is clear from the results shown in Table 3, the amount of polymer scale deposition largely depends on the type of the polymerization initiator. For example, the amount was quite large in Polymerization Runs No. 5 to No. 7 and No. 12 to No. 14 undertaken by use of EEP and MPC as the polymerization initiator, respectively, in the conventional procedure while the polymer scale deposition could be greatly reduced to a negligibly small amount when the polymerization was undertaken in a reactor having the inner walls coated according to the invention as is hown in Polymerization Runs No. 19 to No. 21.

EXAMPLE 2

The inner walls of a stainless steel-made polymerization reactor of 100 liter capacity and the surface of the stirrer coming into contact with the monomer during polymerization were coated with a methyl alcohol solution containing (a) the condensation product and (b) the sulfonated condensation product indicated in Table 4 below in a proportion also indicated in the same table to give a total concentration of (a) and (b) of 0.5% by weight and the coated surface was dried by heating at 90° C. for 10 minutes followed by washing with water.

Into the polymerization reactor thus coated on the inner walls were introduced 40 kg of water, 17 kg of vinyl chloride monomer, 3 kg of vinyl acetate monomer, 12 g of partially saponified polyvinyl alcohol, 4 g of a hydroxypropyl methylcellulose, 6 g of MPC as the polymerization initiator and 200 g of trichloroethylene to form a polymerization mixture and, after 15 minutes of preparatory stirring, polymymerization reaction was performed by heating the mixture at 58° C. for 12 hours under agitation. After completion of the polymerization reaction, the polymerizate slurry was discharged out of the reactor and the amount of the polymer scale deposition on the reactor walls was examined to give the results shown in Table 4.

As is understood from the results shown in this table, the amount of polymer scale deposition was considerably large in Polymerization Runs No. 43 and No. 44 presumably because of the improper molar proportion of the aniline and nitrobenzene used in the preparation of the condensation product.

TABLE 4

| Experiment No. | Coating composition (a) Condensation product No. | (b) Sulfonated condensation product No. | (a)/(b), ratio by weight | Amount of scale deposition, g/m² |
|---|---|---|---|---|
| 22 | None | None | — | 1800 |
| 23 | 2 | — | 100/0 | 1500 |
| 24 | 13 | — | 100/0 | 1500 |
| 25 | 18 | — | 100/0 | 1300 |
| 26 | 5 | — | 100/0 | 1700 |
| 27 | 12 | — | 100/0 | 1600 |
| 28 | — | 21 | 0/100 | 1500 |
| 29 | — | 28 | 0/100 | 1700 |
| 30 | — | 36 | 0/100 | 1600 |
| 31 | — | 25 | 0/100 | 1700 |
| 32 | — | 30 | 0/100 | 1550 |
| 33 | 18 | 38 | 28/72 | 0 |
| 34 | 18 | 38 | 90/10 | 0 |
| 35 | 13 | 26 | 75/25 | 1 |
| 36 | 5 | 25 | 82/18 | 4 |
| 37 | 12 | 32 | 75/25 | 3 |
| 38 | 4 | 27 | 67/33 | 1 |
| 39 | 8 | 33 | 5/95 | 2 |
| 40 | 11 | 36 | 10/90 | 0 |
| 41 | 15 | 22 | 20/80 | 2 |
| 42 | 17 | 38 | 30/70 | 1 |
| 43 | 19 | 38 | 30/70 | 150 |
| 44 | 20 | 38 | 30/70 | 180 |

EXAMPLE 3

The inner walls of a stainless steel-made polymerization reactor of 500 liter capacity and the surface of the stirrer coming into contact with the monomer during polymerization were coated with a methyl alcohol solution containing (a) the condensation product and (b) the sulfonated condensation product indicated in Table 5 below in a proportion also indicated in the table to give a total concentration of (a) and (b) of 1.0% by weight and the coated surface was dried by heating at 90° C. for 10 minutes followed by washing with water.

Into the polymerization reactor thus coated on the inner walls were introduced 200 kg of water, 100 kg of styrene monomer, 1 kg of calcium phosphate, 10 g of sodium dodecylbenzene sulfonate and 50 g of BEP to form a polymerization mixture and the polymerization reaction was performed by heating the mixture at 60° C. for 5 hours under agitation.

After completion of the polymerization reaction, the polymerizate slurry was discharged out of the reactor and the amount of polymer scale deposition on the reactor walls was determined to give the results shown in Table 5.

TABLE 5

| Experiment No. | Coating composition (a) Condensation product No. | Coating composition (b) Sulfonated condensation product No. | (a)/(b), ratio by weight | Amount of scale deposition, g/m$^2$ |
| --- | --- | --- | --- | --- |
| 45 | None | None | — | 280 |
| 46 | 18 | — | 100/0 | 250 |
| 47 | — | 38 | 0/100 | 180 |
| 48 | 18 | 38 | 28/72 | 3 |
| 49 | 18 | 38 | 90/10 | 5 |
| 50 | 1 | 21 | 30/70 | 7 |
| 51 | 2 | 28 | 15/85 | 6 |
| 52 | 3 | 24 | 20/80 | 5 |
| 53 | 6 | 35 | 10/90 | 3 |
| 54 | 7 | 31 | 5/95 | 2 |
| 55 | 9 | 23 | 93/7 | 10 |
| 56 | 10 | 30 | 85/15 | 12 |
| 57 | 12 | 32 | 18/82 | 7 |
| 58 | 14 | 34 | 80/20 | 15 |
| 59 | 16 | 21 | 90/10 | 9 |

What is claimed is:

1. In a method for preventing deposition of polymer scale on the walls of a polymerization reactor in the polymerization of an ethylenically unsaturated monomer which comprises:
   (i) coating the walls of the polymerization reactor prior to the introduction of the polymerization mixture with a coating composition comprising
      (a) a condensation product of an aromatic amine compound and an aromatic nitro compound and
      (b) an alkali metal or ammonium salt of a sulfonation product of a condensation product of an aromatic amine compound and an aromatic nitro compound, dissolved in a solvent;
   (ii) drying the thus coated walls of the polymerization reactor;
   (iii) polymerizing said monomer in the presence of a monomer-soluable organic peroxide having a relatively high solubility in water of at least 0.2% by weight of 20° C. as the polymerization initiator.

2. The method as claimed in claim 1 wherein the weight ratio of the component (a) to the component (b) in the coating composition is in the range from 95:5 to 5:95 by weight.

3. The method as claimed in claim 1 wherein the aromatic amine compound is aniline or a nucleus-substituted aniline having one or two substituent groups, one of the substituent groups on the benzene nucleus being selected from the class consisting of —NH$_2$, —Cl, —N=N—C$_6$H$_5$, —OH, —COCH$_3$, —OCH$_3$, —NH—CO—CH$_3$, —NH—C$_6$H$_5$, —NH—C$_6$H$_4$—NH$_2$, —NH—C$_6$H$_4$—OCH$_3$, —N(CH$_3$)$_2$, —NH—C$_6$H$_4$—OH and alkyl groups having 1 to 3 carbon atoms and the other of the substituent groups, if any, being selected from the class consisting of —NH$_2$, —OH and —CH$_3$.

4. The method as claimed in claim 1 wherein the aromatic nitro compound is nitrobenzene or a nucleus-substituted nitrobenzene having a substituent group selected from the class consisting of —OH, —OCH$_3$, —OC$_2$H$_5$, —Cl, —NH$_2$, —COOH and —SO$_3$H.

* * * * *